(12) United States Patent
Sayers (10) Patent No.: US 7,620,016 B2
(45) Date of Patent: Nov. 17, 2009

(54) CONTROLLED WIRELESS ACCESS TO A LOCAL AREA NETWORK

(75) Inventor: Craig P. Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1176 days.

(21) Appl. No.: 10/685,742

(22) Filed: Oct. 15, 2003

(65) Prior Publication Data

US 2005/0083882 A1  Apr. 21, 2005

(51) Int. Cl.
*H04W 4/00* (2006.01)
(52) U.S. Cl. .................. 370/331; 370/908; 455/436
(58) Field of Classification Search ................ 370/331, 370/332, 908; 455/436, 437, 438, 439, 440, 455/446, 439.44

See application file for complete search history.

(56) References Cited

U.S. PATENT DOCUMENTS

| 6,201,962 | B1 * | 3/2001 | Sturniolo et al. ............. 455/436 |
| 6,776,334 | B1 * | 8/2004 | Garg .......................... 235/384 |
| 6,879,600 | B1 * | 4/2005 | Jones et al. ................. 370/332 |
| 6,967,938 | B1 * | 11/2005 | Kang et al. ................. 370/331 |
| 2002/0164997 | A1 | 11/2002 | Parry |
| 2002/0194141 | A1 * | 12/2002 | Langensteiner et al. ....... 705/67 |

* cited by examiner

*Primary Examiner*—Quochien B Vuong (57) ABSTRACT

Method and system for controlling wireless access to a local area network. A first area is provided for wireless access to a local area network. Wirelessly transmitted within a second area is information needed by a wireless device to gain access to the local area network. At least part of the first area is outside the second area.

30 Claims, 7 Drawing Sheets

CONTROLLED WIRELESS ACCESS TO A LOCAL AREA NETWORK

FIELD OF THE INVENTION

The present disclosure generally relates to methods and systems for controlling wireless access to local area networks.

BACKGROUND

In recent years, wireless communications technology has experienced tremendous growth. Wireless technology allows people to exchange information using a variety of wireless devices, including laptop computers, personal data assistants (PDAs), and cell phones, among others. Wireless access to communication networks, as well as wireless networks, have become increasingly available in businesses and homes. For example, a business may use a wireless network to allow employees to exchange information over a private local area network (LAN). In another example, a business, such as a coffee house or restaurant, may provide internet access to customers through a wireless base station. In yet another example, homes may have a computer for each family member with a wireless local area network connecting the family computers together and also providing Internet access.

Wireless communication signals operating over radio frequencies can penetrate walls and may be intercepted by innocent or not-so-innocent third parties. Network security is a concern for maintaining private information or to prevent unauthorized users from accessing the network. Methods and systems that address the aforementioned problems, as well as other related problems, are therefore desirable.

SUMMARY OF THE INVENTION

In accordance with various embodiments, controlled wireless access to a local area network is provided. A first area is provided for wireless access to a local area network. Wirelessly transmitted within a second area is information needed by a wireless device to gain access to the local area network. At least part of the first area is outside the second area.

BRIEF DESCRIPTION OF THE DRAWINGS

Various aspects and advantages of the invention will become apparent upon review of the following detailed description and upon reference to the drawings in which.

DETAILED DESCRIPTION

In the following description of the various embodiments, reference is made to the accompanying drawings which form a part hereof, and in which is shown, by way of illustration, various embodiments by which the invention may be practiced. It is to be understood that other embodiments may be utilized, and structural and functional modifications may be made without departing from the scope of the present invention.

Various embodiments of the present invention involve systems and methods for controlling access to network by a wireless device. A wireless device may be used to establish a wireless communication link with a wireless local area network (LAN) and thus gain access to a wired networks, such as the Internet, through the wireless link. With conventional wireless local area network protocols, such as IEEE 802.11, security is a significant concern. Although wireless local area networks (LANs) have many advantages over wired networks, they are also inherently less secure. Wireless network interface cards broadcast spread spectrum radio signals and are vulnerable to unauthorized use and eavesdropping. Unlike wired networks, wireless LANs can be passively intercepted without sophisticated equipment or sophisticated knowledge by the interceptor. In addition, since the radio signals may pass through walls, the wireless network does not benefit from physical security.

In one configuration of a wireless Local Area Network (LAN) protocol, e.g., 802.11b, a wireless access point (AP) acts as a bridge for a set of associated stations, which may be laptop computers or other wireless devices operating wireless network interface cards (NICs). Wireless access points and wireless devices exchange management frames to associate with each other. An access point (AP) may periodically transmit signals containing a unique identifier for the AP. In the 802.11b Basic Service Set (BSS) protocol, for example, an AP periodically transmits a unique identifier for the BSS known as a service set identifier (SSID). Wireless devices also transmit probe frames to find access points. When a wireless device finds an access point, it initiates an association and suggests an authentication method. In open system authentication, no authentication is required. In open system authentication, any station is allowed to enter the network.

In another configuration, authentication may be required before the wireless device joins the network. In one scenario, prior to entering the network a wireless device may propose, for example, a shared key authentication. In a shared key authentication, the AP generates a challenge text and sends it to the wireless device. The wireless device returns the challenge, encrypted with a shared key that is known to the wireless device and the AP. The AP decrypts the challenge using the shared key. If the decrypted frame matches the original challenge, the wireless device is accepted as an authorized user of the network. The challenge and response may be repeated from the wireless device to the AP for mutual authentication.

Data transmitted over the wireless network may be encrypted to prevent an eavesdropper from reading it. For example, again using IEEE 802.11, each packet may be encrypted using an RC4 cipher stream generated as a function of the same shared key used for the authentication described above.

While use of a shared key provides some security, it is not a complete solution. An eavesdropper who observes a large number of transmitted packets can gain sufficient information to recover the shared key, thus compromising the network. In addition, the need to share the key imposes significant overhead.

For example, consider a home user with an access point connected to the Internet and three wireless devices. Currently the home user only has two choices. One is to have an open network without any security. This is convenient, but allows anyone nearby to get free access (including people parked in cars on the street outside) and allows eavesdroppers to listen in. The alternative is to have a closed network and use a shared key, but in that case the user must manually configure each of the wireless devices. This procedure is cumbersome, prone to error, and difficult to debug when it doesn't work.

In another example, consider the case of a hotel that wishes to provide free wireless Internet access to guests on a particular floor. The hotel can use an open network, but then guests on neighboring floors could also get access. The hotel could use a closed network, but using a closed network imposes an additional burden, requiring each wireless device to be suitably configured.

Figure 1:
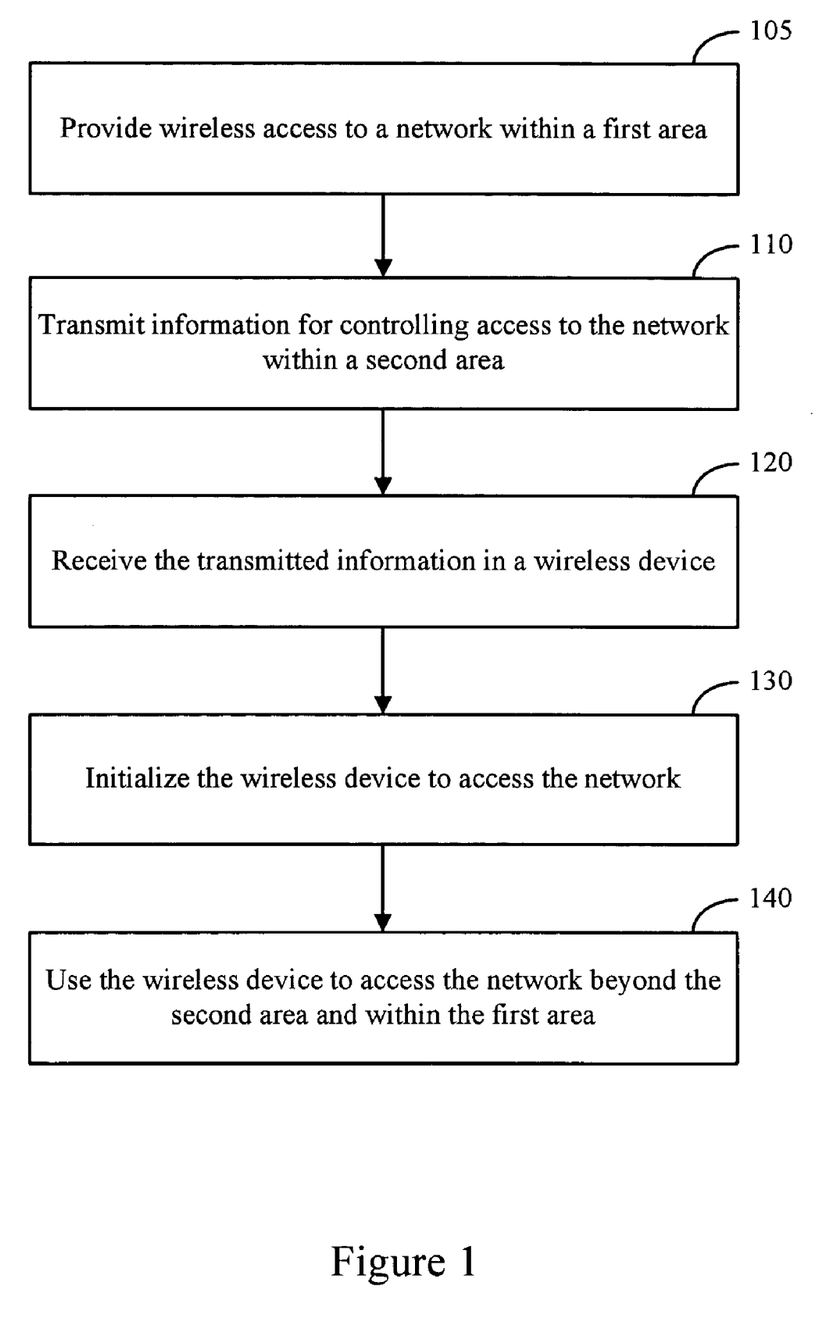
FIG. 1 is a flow chart of a method of implementing secure network set up in accordance with embodiments of the invention.

An approach for providing access to a network in accordance with embodiments of the invention is illustrated in the flow graph of FIG. 1. According to this approach, wireless access to a network is provided 105 within a first area. Information for controlling access to the network is transmitted 110 within a second area. For example, information for controlling access to the network may be transmitted from a configuration device to the wireless device of a prospective user of the network. The information is transmitted within a second area, thus the wireless device must be positioned within the second area to receive 120 the information.

The information may include security information, such as an encryption key, and/or access point information. Alternatively, or additionally, the information transmitted to the wireless device may provide the user with directions for obtaining or calculating the security information. The information is used to initialize 130, configure, or otherwise allow the wireless device to gain access the network. Initialization may be performed automatically upon receipt of the transmitted information, for example. Following initialization of the wireless device, the wireless device may be used to access 140 the network. The user may access the network through the wireless device outside the second area, anywhere wireless access to the network is provided, i.e., within the first area.

Figure 2A:
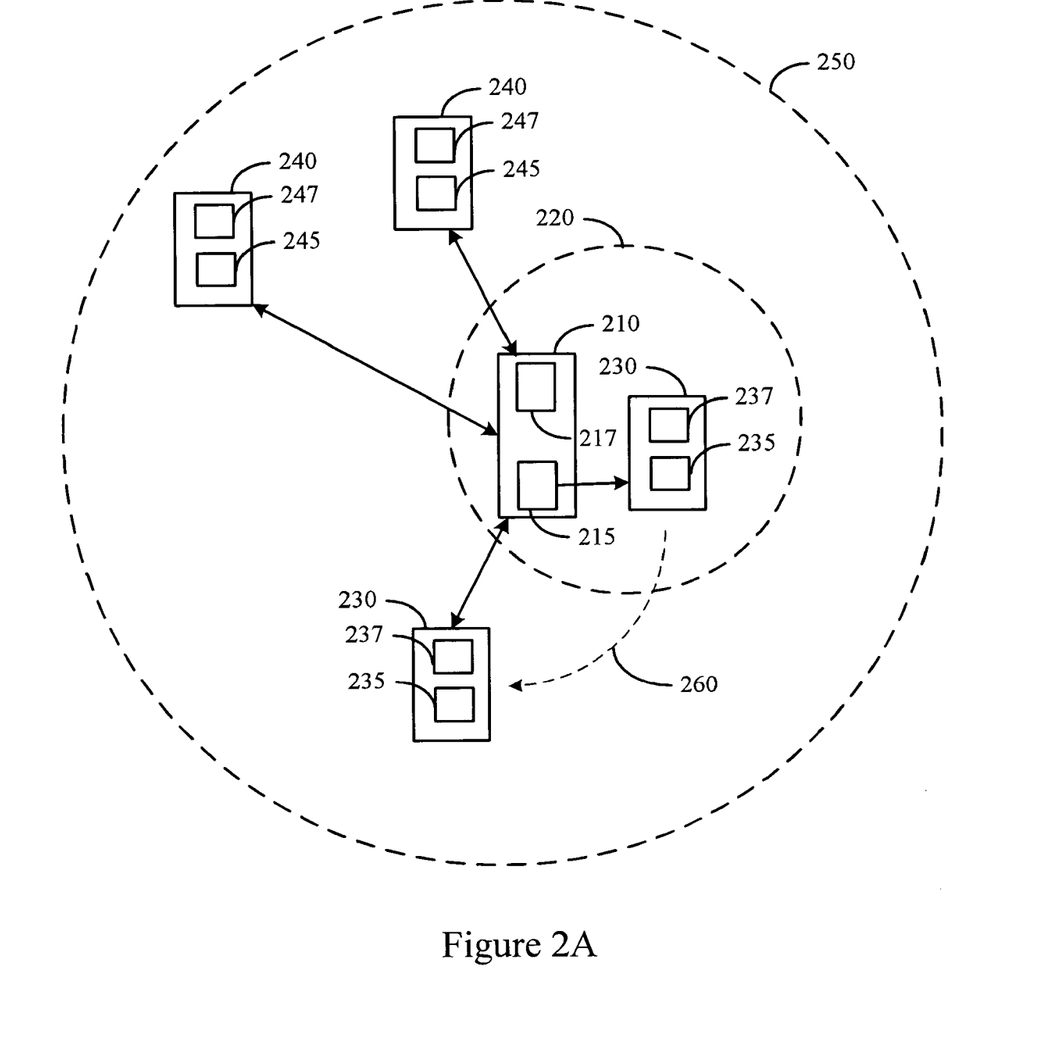
FIGS. 2A-2B are conceptual diagrams illustrating a controlled access system in accordance with embodiments of the invention.
Figure 2B:
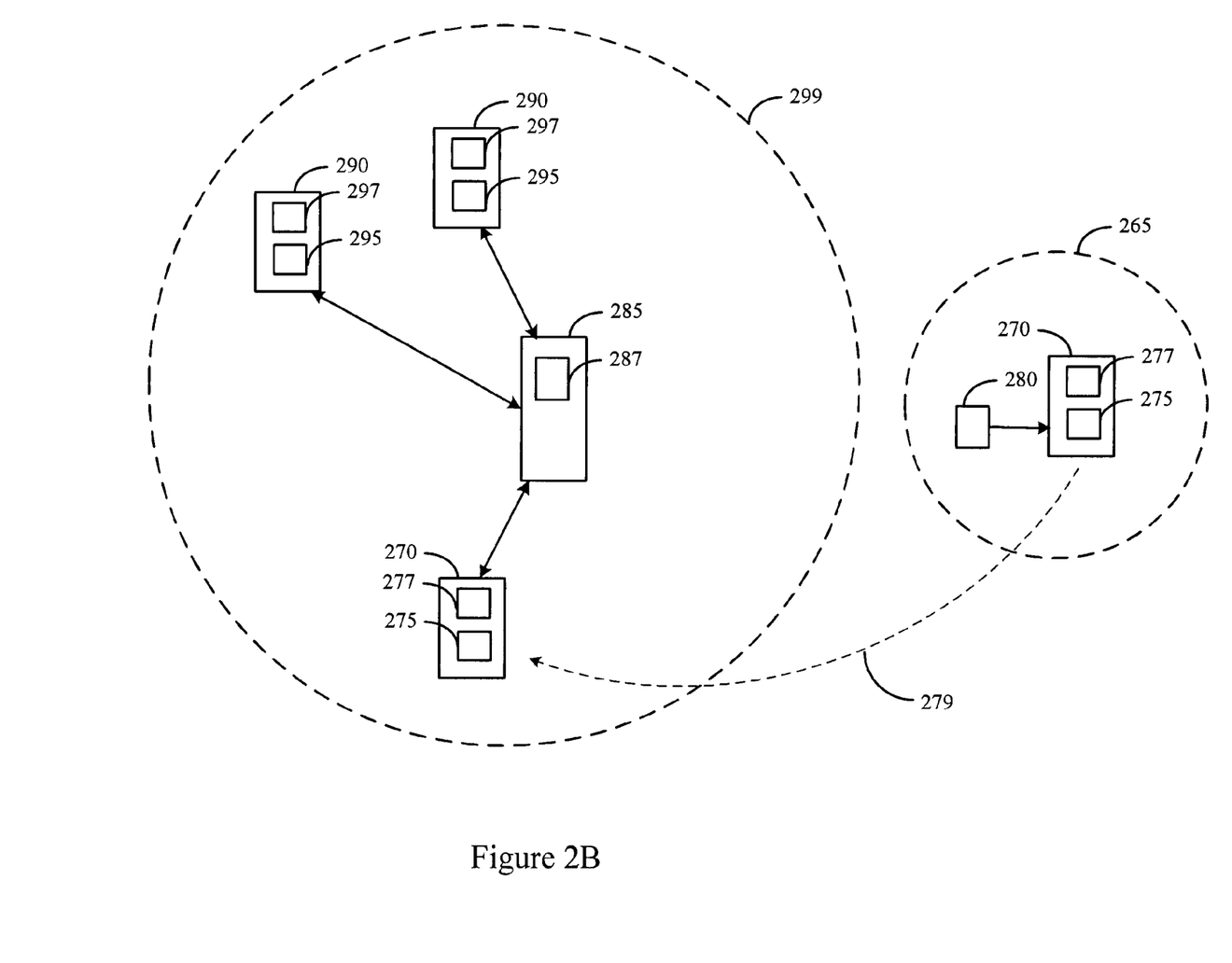

FIGS. 2A-2B are conceptual diagrams illustrating a system for controlling access to a network in accordance with embodiments of the invention. As shown in FIG. 2A, a wireless base station 210 of a wireless network includes a configuration transmitter 215. The configuration transmitter 215 transmits information about the wireless network to one or more wireless devices 230 within transmission range of the configuration transmitter, denoted herein as the second area 220. In one embodiment, the configuration transmitter 215 may be an optical transmitter, such as an infrared (IR) transceiver, or other line-of-sight-type transmitting device. In another embodiment, the configuration transmitter 215 may be configured to transmit over a limited radio connection (e.g. short-range Bluetooth or an IEEE 802.11 device with, in some embodiments, an unusually low output power or highly-directional antenna). In yet another embodiment, the transmission signals of the configuration transmitter 215 are constrained by a physical barrier. For example, in the case of an optical transmitter, the transmission may be constrained by walls or other optically opaque barriers.

The wireless device 230 includes a configuration receiver 235. When the wireless device 230 is located within the transmission range 220 of the configuration transmitter 215, the configuration receiver 235 of the wireless device 230 receives transmissions from the configuration transmitter 215 comprising information associated with the wireless network. The information may include security information, such as a password, encryption key, or the like.

After the wireless device 230 receives the configuration information, the wireless device 230 may automatically, or upon request, execute a configuration application to configure itself to access the network. The wireless device 230 includes wireless communications circuitry 237 compatible with the communications circuitry 217 of the base station 210. The wireless device 230 may access the network within the second area 220 associated with the configuration transmitter 215. The wireless device 230 may also be repositioned 260 outside the second area 220, but within the transmission range 250 of the base station to access the network, denoted herein as the first area. As illustrated in FIG. 2A, other wireless devices 240 having configuration receivers 245 may receive information from the configuration transmitter 215, perform the configuration, and access the network through wireless network circuitry 247 as previously described.

FIG. 2B conceptually illustrates another embodiment of a controlled access system. In this embodiment, the configuration transmitter 280 is implemented as a separate device from the wireless network base station 285. Further, the transmission range 265 of the configuration transmitter 280 (i.e., the second area) falls outside the network's wireless access area 299 (i.e., the first area). In this embodiment, the configuration transmitter 280 transmits information about the wireless network to the configuration receiver 275 of the wireless device 270. After receiving the information from the configuration transmitter 280, the wireless device 270 may be repositioned 279 to a location outside the second area 265, but within the first area.

The wireless device 270 uses the configuration information to execute a configuration application in preparation for accessing the network. The repositioned wireless device 270 may join other wireless devices 290 in the wireless network access area 299, each wireless device 270, 290 having a configuration receiver 275, 295 and wireless communication circuitry 277, 297 as previously described.

Figure 3A:
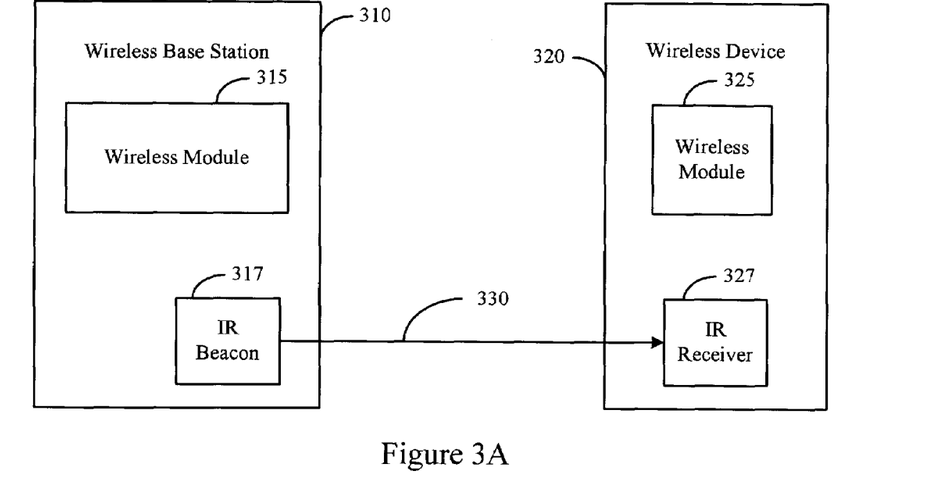
FIGS. 3A and 3B are block diagrams illustrating components of the controlled access system in accordance with various embodiments of the invention.
Figure 3B:
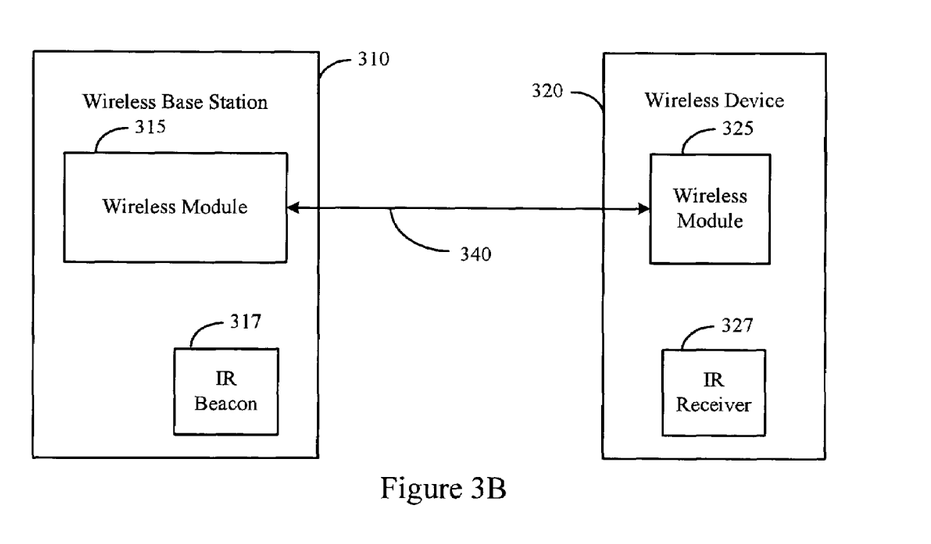

FIGS. 3A and 3B are block diagrams illustrating the controlled access system in accordance with various embodiments of the invention. As illustrated in FIGS. 3A and 3B, a wireless base station 310 includes a wireless communications module 315, e.g., a network interface card compatible with IEEE 802.11b, or other communication protocol. The wireless base station 310 also includes a configuration transmitter 317. In the embodiment illustrated in FIGS. 3A and 3B, the configuration transmitter 317 is implemented as an infrared (IR) transmitter.

The IR transmitter 317 of the wireless bases station 310 and the IR receiver 327 in the wireless device 320 establish a communications link 330 (FIG. 3A). The IR transmitter 317 transmits configuration information as a line-of-sight communication stream to the IR receiver 327 in the wireless device 320 over the communications link 330. The information may be an encryption key, access point information, or other information that allows the wireless device 320 to access the wireless network. After the information is transmitted from the IR transmitter 317 and received by the IR receiver 327, the IR communication link 330 between the base station 310 and the wireless device 320 may be terminated.

As previously discussed, the wireless device 320, for example, a laptop or personal data assistant, uses the configuration information to access the network. The wireless device 320 and the wireless base station 310 establish a network communications link 340 (FIG. 3B) between compatible wireless modules 325, 315 in the wireless device 320 and base station 310, respectively.

Figure 4:
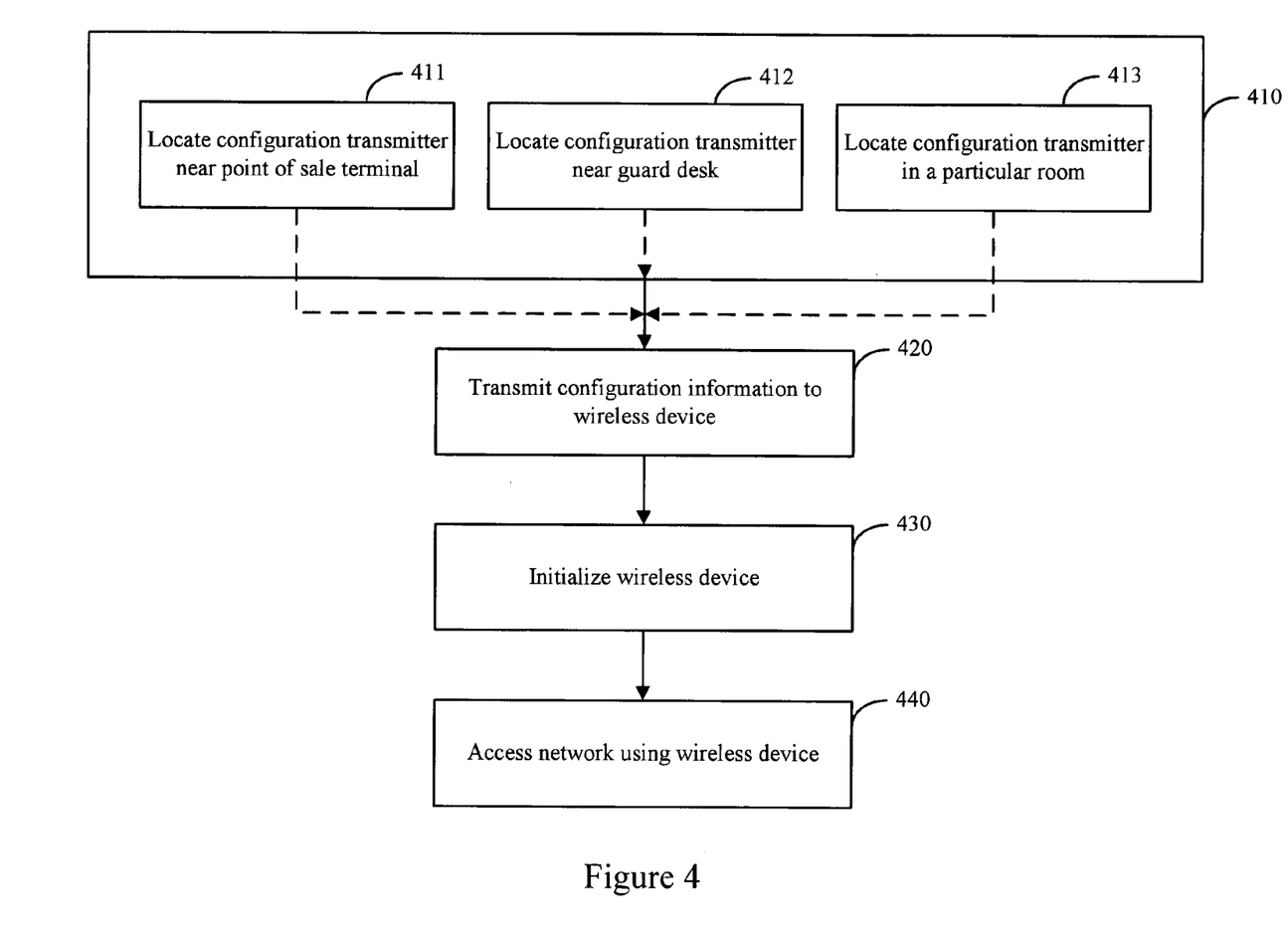
FIG. 4 is a flow chart illustrating various approaches for implementing the controlled access system according to embodiments of the invention.

FIG. 4 is a flow chart illustrating various approaches for implementing the secure set up system according to embodiments of the invention. The secure set up described herein may be particularly useful to implement a secure wireless network access for businesses or families where some control over either the network users, potential eavesdroppers, or both, is desired. In these situations, the configuration transmitter may be located 410 in a secure or monitored location. In one example, a business, such as a coffee house or restaurant, may provide internet access to customers. The secure network set up may be implemented to provide internet access to customers but not to people in neighboring establishments.

In this example, the configuration transmitter may be located 411 near a point of sale terminal. Customers may be required to make a purchase before gaining access to the configuration information transmission. For example, if the business is a restaurant, the customer may be required to come to the cash register to purchase food and at that time the configuration information may be transmitted 420 to the customer's wireless device. The business may provide the information for free, or may charge a fee for the configuration transmission itself, in addition to any product purchases the customer may make.

In another example, the secure set up system may be used by a business to provide network access to employees or other authorized users, while restricting network access to eavesdroppers. In this illustrative implementation, the configuration transmitter may be located in a secure location 412, such as behind a guard desk. An employee of the business checks in at the guard desk, for example, by displaying the employee's company badge. At that time, the configuration information may be transmitted 420 from the configuration transmitter to the employee's wireless device.

After the network user has received the configuration information, the user's wireless device may be initialized 430 to access the network. The user is then free to roam 440 anywhere in or nearby the business or home while maintaining the network connection.

The configuration information may be periodically changed. This enhances security and also restricts the duration of access. For example, a coffee shop may choose to change the configuration nightly to prevent a customer who visited the store on Monday from getting free access from the store or a neighboring store on Tuesday.

Figure 5A:
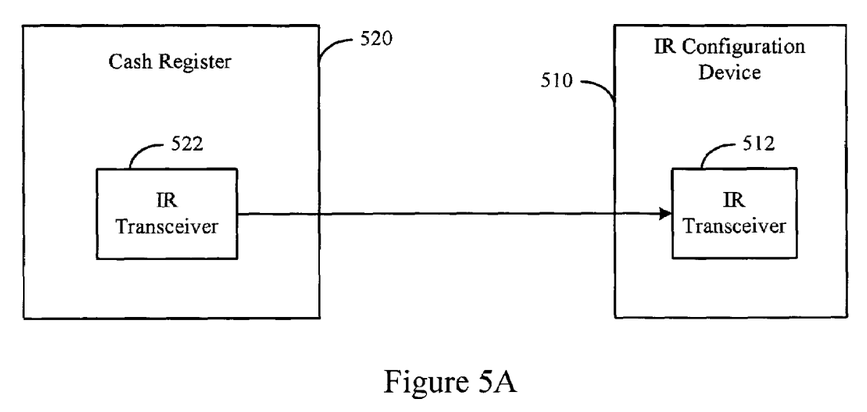
FIGS. 5A-5C are block diagrams illustrating components of the controlled access system employing a mobile IR configuration device in accordance with embodiments of the invention.
Figure 5B:
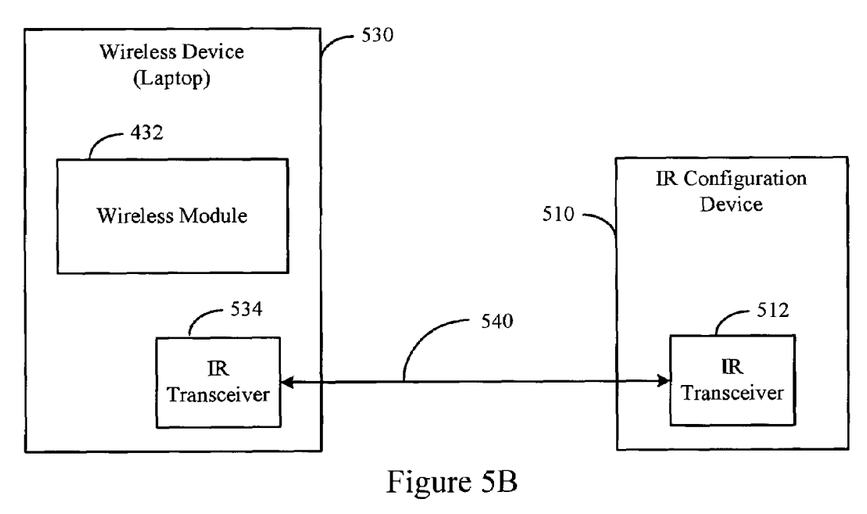
Figure 5C:
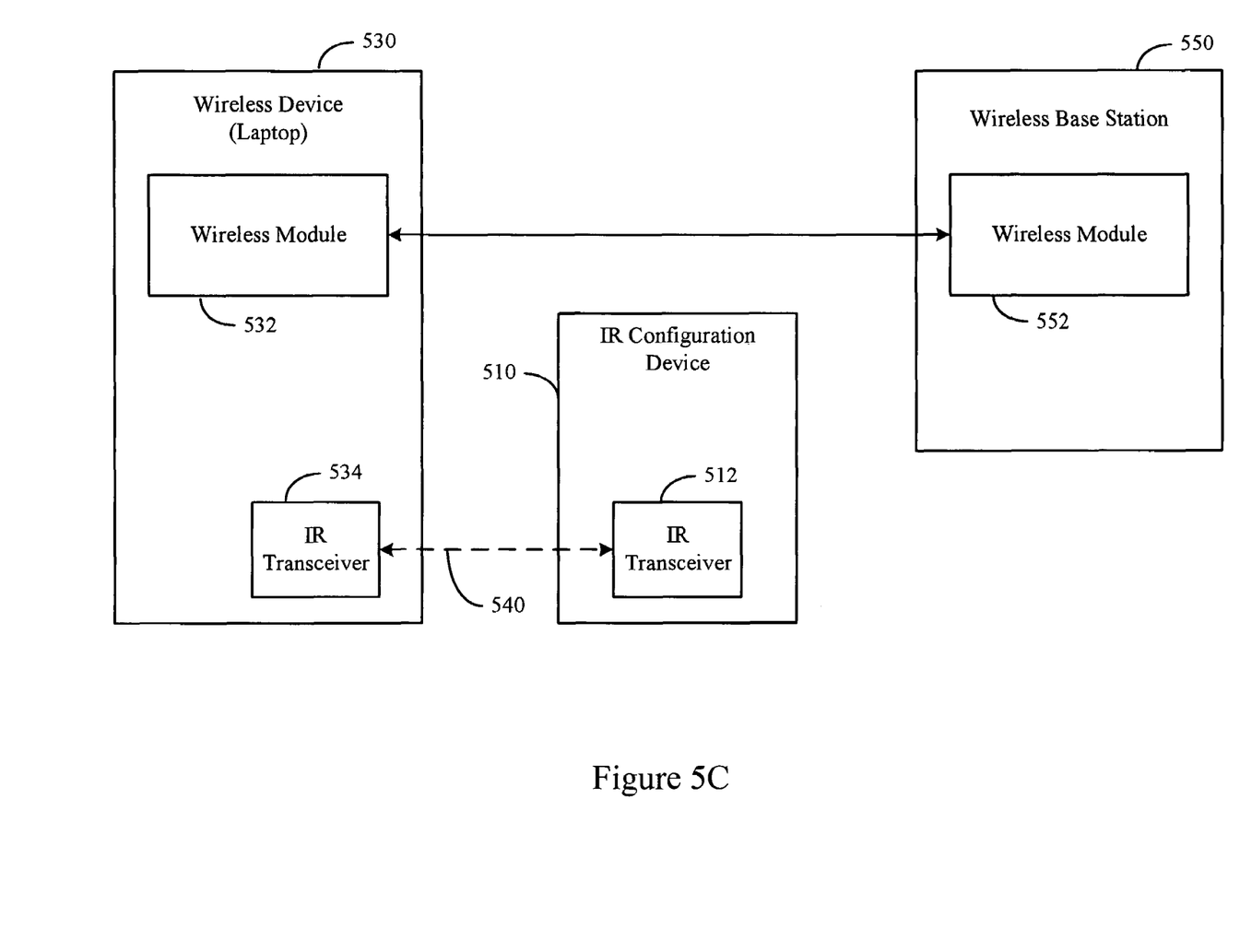

FIGS. 5A-5C are block diagrams illustrating a controlled access system employing a mobile IR configuration device in accordance with further embodiments of the invention. As shown in FIG. 5A, an IR configuration device 510, including an IR transceiver 512, may be employed to receive the configuration information from a central device 520, e.g., a business cash register. In this implementation, the central device 520 includes an IR transceiver 522 for communicating with the IR configuration device 510. For additional security, that communication may use a non-standard protocol and may be encrypted. The IR configuration device 510 includes a small amount of memory to store the configuration information.

If a customer would like to purchase network access, the customer may pay a fee and receive the IR configuration device 510. In one implementation, the customer purchases the IR configuration device 510 and uses the IR configuration device 510 each time the customer wishes to access the network provided by the business. In another implementation, the customer pays a fee to use the IR configuration device 510 and returns the IR configuration device 510 to the business following use.

As shown in FIG. 5B, The IR configuration device 510 and the customer's wireless device 530 establish a communication link 540 between the IR transceivers 534, 512 of the wireless device and the IR configuration device. The configuration information is transmitted from the IR configuration device 510 to the wireless device 530. In an alternative embodiment, the configuration device may be physically connected to the wireless device (for example, via a Universal Serial Bus (USB) connection).

After receiving the configuration information from the IR configuration device 510, e.g., the encryption key for the network, the wireless device 530 may establish communications with the wireless base station 550 of the business to access the Internet via the wireless local area network provided by the business, as illustrated in FIG. 5C. More specifically, the wireless module 532 of the wireless device 530 operating a communications protocol such as IEEE 802.11b, establishes communications to the wireless network through the IEEE 802.11b-compatible wireless module 552 of the wireless base station 550. In this configuration, the communications link 540 between the IR transceivers 534, 512 of the wireless device and the IR configuration device is no longer required and may be terminated.

The IR configuration device 510 offers a convenience to the customer since it does not require the customer to the carry the wireless device to a location near the configuration transmitter. It can also provide additional services. For example it may include circuitry for keeping track of the amount of time the wireless device 530 uses the network. In this implementation, the customer may be charged for the IR configuration device 510, for the time spent using the network, or both. In yet another implementation, the IR configuration device 510 may be a multi-purpose device. For example, the IR configuration device 510 may be used to provide the network configuration information as described above, and the IR configuration device 510 may also be used as a stored-value card for purchasing products sold by the business.

For example, a coffee shop could sell, for a selected fee, a configuration device that provides free wireless access in the store and the ability to purchase goods worth the selected fee. To make a purchase, a customer initiates communication between the configuration device and the cash register. From the customer's point of view, establishing communication may be accomplished, for example, simply by pointing the configuration device at the cash register and pressing a button. Using the configuration device, the customer may purchase coffee and may also obtain configuration information for wirelessly accessing the network. Upon returning to his or her table, the customer may connect the configuration device to the wireless device in order to access the wireless network.

In another example, an airline might provide free wireless access to frequent flyers. It provides each frequent flyer with an IR configuration device. That device serves the dual purpose of providing access to the airlines wireless network and also providing entry to the airline's lounge at airports. To gain entry to the lounge, a customer may use the IR configuration device to transmit a signal to a device positioned at the entry to the lounge. From the customer's perspective, this may be as simple as pointing the IR configuration device at the door of the lounge and pressing a button. To gain access to the network through a wireless access point provided by the airlines, the customer positions the IR configuration device within line-of-sight of an access point with an IR configuration transmitter. The IR configuration transmitter sends the configuration information to the wireless device. Following configuration, the wireless device may access the network beyond the range of the IR configuration transmitter with within the transmission range of the access point.

Various embodiments of the invention are believed to be particularly applicable in setting up secure networks for business or private use. The approaches of the present invention may be used to provide security for private local area networks. Various embodiments of the invention illustrate methods and systems for transmitting security or other information associated with a network to users within a designated transmission range. The transmission of the security or other information may be limited to a transmission range within a secure or monitored area to which access is restricted by way of physical barriers or human control, for example. This approach may be used to reduce the incidents of eavesdropping and/or unauthorized network access by third parties who are within the transmission range of the network.

The approaches described herein, in accordance with embodiments of the invention, further provide a method for automated encryption key exchange, among other features. Automated encryption key exchange obviates the need for manual entry of encryption key information, a potentially error prone process.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for controlling network access, comprising:
   providing a first area for wireless access to a local area network; and
   wirelessly transmitting within a second area and by using a line-of-sight beacon information needed by a wireless device to gain access to the local area network, wherein at least part of the first area is outside the second area.

2. The method of claim 1, wherein transmitting the information comprises transmitting encryption key information.

3. The method of claim 1, wherein transmitting the information comprises transmitting access point information.

4. The method of claim 1, wherein the first area is a transmission range of a component of the local area network, the second area is a transmission range of another component receiving the wirelessly transmitted information, and the second area is smaller than the first area.

5. The method of claim 1, wherein transmitting the information comprises transmitting the information using an optical beacon.

6. The method of claim 5, wherein transmitting the information for controlling access to the local area network comprises transmitting the information using an infrared beacon.

7. A method for accessing a network, comprising:
   providing a first area for wireless access to a local area network;
   wirelessly transmitting, by using a line-of-sight beacon, information for controlling access to the local area network within a second area, wherein at least part of the first area is outside the second area;
   receiving the information in a wireless device;
   initializing the wireless device to access the local area network using the information; and
   accessing the local area network with the wireless device at a location within the first area and outside the second area.

8. The method of claim 7, wherein transmitting the information comprises transmitting an encryption key.

9. The method of claim 7, wherein transmitting the information comprises transmitting an access point identifier.

10. The method of claim 7, wherein transmitting the information comprises transmitting information that allows the wireless device to obtain an encryption key.

11. The method of claim 7, wherein the first area is a transmission range of a component of the local area network, the second area is a transmission range of another component receiving the wirelessly transmitted information, and the second area is smaller than the first area.

12. The method of claim 7, wherein the second area is within the first area.

13. The method of claim 7, wherein the second area is outside the first area.

14. The method of claim 7, wherein transmitting the information for controlling access to the local area network comprises transmitting the information using an optical beacon.

15. The method of claim 7, wherein the second area comprises a secure area.

16. The method of claim 7, wherein the second area comprises an area near a point of sale terminal.

17. The method of claim 7, further comprising charging a fee for accessing the local area network.

18. A system for providing wireless network access to at least one wireless device, comprising:
   a network access circuit arrangement adapted to provide a wireless device with access to a local area network within a wireless-access area after the wireless device is configured for local area network access; and
   a configuration circuit arrangement, coupled to the network access circuit arrangement, the configuration circuit arrangement adapted to wirelessly transmit within a configuration-information area and by using a line-of-sight beacon information for controlling access to the local area network, wherein at least part of the wireless-access area is outside the configuration-information area.

19. The system of claim 18, wherein the wireless access area is a transmission range of a component of the local area network, the configuration-information area is a transmission range of another component receiving the wirelessly transmitted information, and the configuration-information area is smaller than the wireless access area.

20. The system of claim 18, wherein the configuration-information area is within the wireless access area.

21. The system of claim 18, wherein the configuration-information area is outside the wireless-access area.

22. The system of claim 18, wherein the configuration circuit arrangement is adapted to transmit encryption key information.

23. A system for accessing a network, comprising:
   means for providing a first area for wireless access to a local area network;
   means for wirelessly transmitting, by using a line-of-sight beacon, information for controlling access to the local area network within a second area, wherein at least part of the first area is outside the second area;
   means for receiving the information in a wireless device;
   means for initializing the wireless device to access the local area network using the information; and
   means for accessing the local area network with the wireless device at a location within the first area and outside the second area.

24. The system of claim 18, wherein the configuration circuit arrangement is adapted to transmit information for controlling access to the local area network using an optical beacon.

25. The system of claim 18, wherein the configuration-information area is within a secure area.

26. The system of claim 18, wherein the configuration area is in proximity to a point of sale terminal.

27. A system for providing network access control information, comprising:
   means for providing a first area for wireless access to a local area network; and
   means for wirelessly transmitting within a second area and by using a line-of-sight beacon information needed by a wireless device to gain access to the local area network, wherein at least part of the first area is outside the second area.

28. The system of claim 27, further comprising means for charging a fee in association with access by the first device to the local area network.

29. The system of claim 27, wherein the first area is a transmission range of a component of the local area network, the second area is a transmission range of another component receiving the wirelessly transmitted information, and the second area is smaller than the first area.

30. The method of claim 23, wherein the first area is a transmission range of a component of the local area network, the second area is a transmission range of another component receiving the wirelessly transmitted information, and the second area is smaller than the first area.

* * * * *

UNITED STATES PATENT AND TRADEMARK OFFICE
CERTIFICATE OF CORRECTION

PATENT NO. : 7,620,016 B2  Page 1 of 1
APPLICATION NO. : 10/685742
DATED : November 17, 2009
INVENTOR(S) : Craig P. Sayers It is certified that error appears in the above-identified patent and that said Letters Patent is hereby corrected as shown below:

In column 10, line 9, in Claim 30, delete "method" and insert -- system --, therefor.

Signed and Sealed this

Sixteenth Day of March, 2010

David J. Kappos
*Director of the United States Patent and Trademark Office*